(12) United States Patent
Hwang et al.

(10) Patent No.: US 12,282,558 B2
(45) Date of Patent: Apr. 22, 2025

(54) SECURE BOOTING APPARATUS AND OPERATING METHOD THEREOF

(71) Applicant: HANWHA TECHWIN CO., LTD., Seongnam-si (KR)

(72) Inventors: Bo Ram Hwang, Seongnam-si (KR); Ji Hyung Ryu, Seongnam-si (KR); Yong Tae Yang, Seongnam-si (KR); Yoon Chul Shin, Seongnam-si (KR)

(73) Assignee: HANWHA TECHWIN CO., LTD., Seongnam-si (KR)

( * ) Notice: Subject to any disclaimer, the term of this patent is extended or adjusted under 35 U.S.C. 154(b) by 0 days.

(21) Appl. No.: 17/767,714

(22) PCT Filed: Aug. 31, 2020

(86) PCT No.: PCT/KR2020/011608
§ 371 (c)(1),
(2) Date: Apr. 8, 2022

(87) PCT Pub. No.: WO2021/071090
PCT Pub. Date: Apr. 15, 2021

(65) Prior Publication Data
US 2024/0086543 A1    Mar. 14, 2024

(30) Foreign Application Priority Data
Oct. 8, 2019   (KR) .................. 10-2019-0124777

(51) Int. Cl.
*G06F 21/57*   (2013.01)
*H04L 9/06*    (2006.01)
(Continued)

(52) U.S. Cl.
CPC .......... *G06F 21/575* (2013.01); *H04L 9/0643* (2013.01); *H04L 9/0825* (2013.01);
(Continued)

(58) Field of Classification Search
CPC ........ G06F 21/50; G06F 21/57; G06F 21/575; G06F 2221/03; G06F 2221/034;
(Continued)

(56) References Cited

U.S. PATENT DOCUMENTS

2008/0298579 A1\* 12/2008 Abu-Amara .......... H04L 63/061
380/30
2013/0013906 A1\* 1/2013 Brown .................. G06F 9/4403
713/2
(Continued)

FOREIGN PATENT DOCUMENTS

CN    104104504 A    10/2014
KR    10-0480998 B1   4/2005
(Continued)

OTHER PUBLICATIONS

Alan Daly et al., "Efficient Architectures for implementing Montgomery Modular Multiplication and RSA Modular Exponentiation n Reconfigurable Logic," FPGA'02 10th ACM International Symposium on Field—Programmable Gate Arrays, Feb. 24-26, 2002, SP058206523, pp. 40-49 (total 10 pages).
(Continued)

*Primary Examiner* — D'Arcy Winston Straub
(74) *Attorney, Agent, or Firm* — Sughrue Mion, PLLC

(57) ABSTRACT

A secure booting apparatus according to an embodiment for solving the problems to be solved by the present invention includes: a memory configured to store encrypted data, an encrypted header, and a symmetric key; and a processor configured to generate decrypted data and a decrypted header by applying a symmetric key algorithm using the symmetric key to the encrypted data and encrypted header, to include a public key and a pre key generated from the public key in the decrypted header, to generate a comparison hashed message by applying a hash algorithm to the decrypted data, to generate a final verification value by
(Continued)

applying a public key algorithm using the public key and the pre key to the decrypted header, to compare the comparison hashed message with the final verification value, and to determine that booting has failed if the comparison hashed message and the final verification value are different from each other.

16 Claims, 4 Drawing Sheets

(51) Int. Cl.
    *H04L 9/08*     (2006.01)
    *H04L 9/14*     (2006.01)
    *H04L 9/30*     (2006.01)
    *H04L 9/32*     (2006.01)

(52) U.S. Cl.
    CPC ............... *H04L 9/14* (2013.01); *H04L 9/302* (2013.01); *H04L 9/3073* (2013.01); *H04L 9/3236* (2013.01); *H04L 9/3247* (2013.01); *G06F 2221/034* (2013.01)

(58) Field of Classification Search
    CPC . H04L 9/06; H04L 9/0643; H04L 9/08; H04L 9/0816; H04L 9/0819; H04L 9/0825; H04L 9/14; H04L 9/30; H04L 9/3066; H04L 9/3073; H04L 9/3006; H04L 9/302; H04L 9/32; H04L 9/3236; H04L 9/3247
    See application file for complete search history.

(56) References Cited

U.S. PATENT DOCUMENTS

| | | | |
|---|---|---|---|
| 2013/0024677 A1 | 1/2013 | Smith et al. | |
| 2015/0199520 A1 | 7/2015 | Woolley et al. | |
| 2017/0115981 A1* | 4/2017 | Oh | G06F 21/64 |
| 2019/0073478 A1* | 3/2019 | Khessib | G06F 13/4282 |
| 2019/0163910 A1 | 5/2019 | Moon et al. | |
| 2020/0036519 A1* | 1/2020 | Bitauld | H04L 9/0897 |
| 2020/0344265 A1* | 10/2020 | Kelly | H04L 63/0823 |
| 2021/0012008 A1* | 1/2021 | Kim | H04L 9/0891 |

FOREIGN PATENT DOCUMENTS

| | | |
|---|---|---|
| KR | 10-0844846 B1 | 7/2008 |
| KR | 10-2011-0075050 A | 7/2011 |
| KR | 10-1237527 B1 | 2/2013 |
| KR | 10-2014-0073384 A | 6/2014 |
| KR | 10-1765209 B1 | 8/2017 |
| KR | 10-2018-0007717 A | 1/2018 |
| KR | 10-2018-0080912 A | 7/2018 |
| KR | 10-2019-0063264 A | 6/2019 |
| WO | 2008/085449 A2 | 7/2008 |
| WO | 2009/108371 A1 | 9/2009 |

OTHER PUBLICATIONS

Communication dated Oct. 12, 2023 issued by European Patent Office in corresponding European Patent Application No. 20873436.8.
Wikipedia, "Advanced Encryption Standard", Wikipedia, 2022, 10 pages total, https://en.wikipedia.org/w/index.php?title=Advanced_Encryption_Standard&oldid=1079747313.
Wikipedia, "RSA (cryptosystem)", Wikipedia, 2022, 11 pages total, https://en.wikipedia.org/w/index.php?title=RSA_(cryptosystem)&oldid=1078389173.
Wikipedia, "Montgomery modular multiplication", Wikipedia, 7 pages total, https://en.wikipedia.org/w/index.php?title=Montgomery_modular_multiplication&oldid=1068211365.
Search Report (PCT/ISA/210) issued Nov. 25, 2020 by the International Searching Authority for International Application No. PCT/KR2020/011608.
Written Opinion (PCT/ISA/237) issued Nov. 25, 2020 by the International Searching Authority for International Application No. PCT/KR2020/011608.
Office Action dated Feb. 22, 2025, issued by Chinese Patent Office in Chinese Patent Application No. 202080071074.8.

* cited by examiner

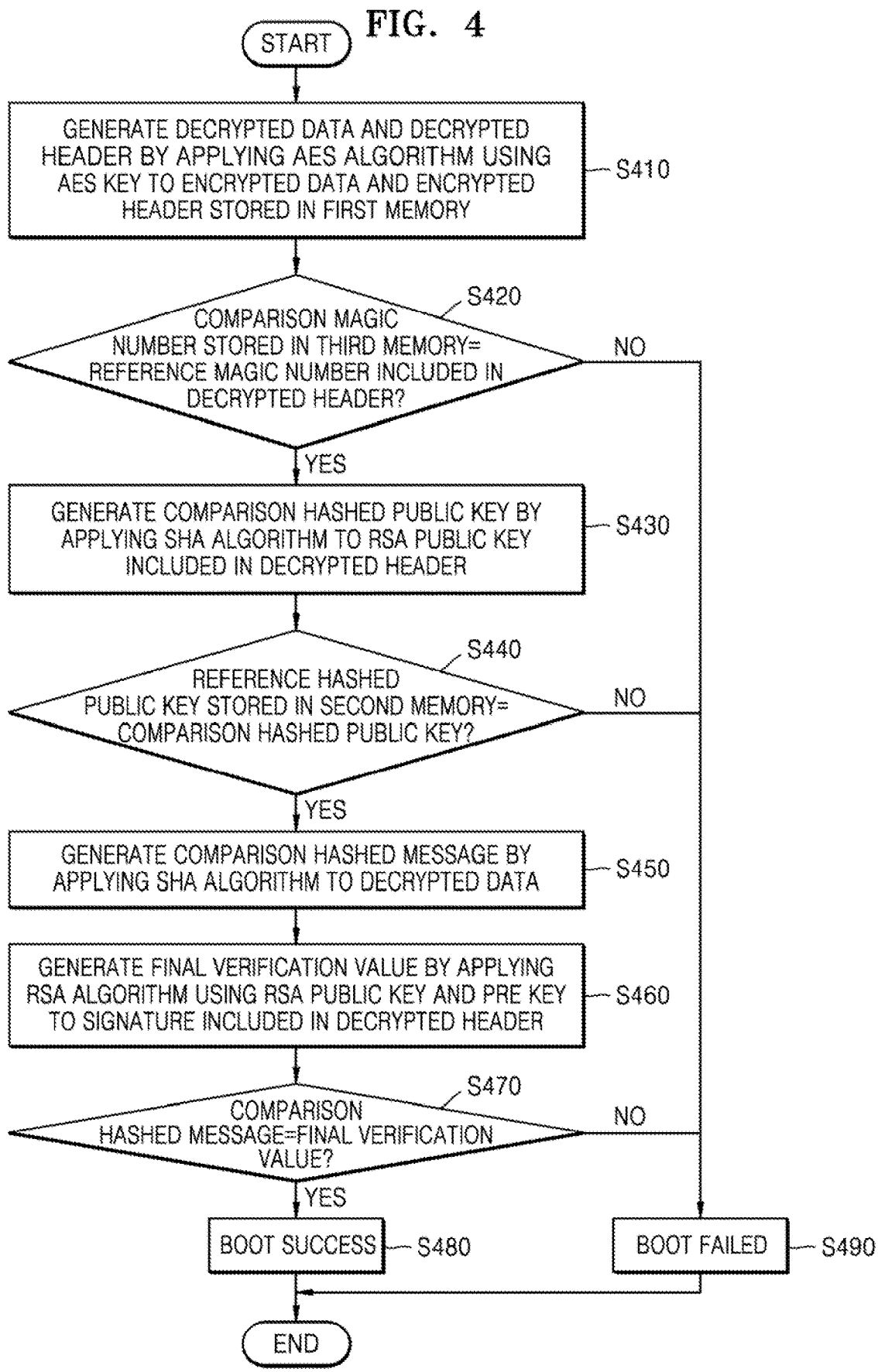

SECURE BOOTING APPARATUS AND OPERATING METHOD THEREOF

CROSS REFERENCE TO RELATED APPLICATIONS

This application is a National Stage of International Application No. PCT/KR2020/011608 filed Aug. 31, 2020, claiming priority from Korean Patent Application No. 10-2019-0124777 filed on Oct. 8, 2019, the disclosures of which are incorporated herein in their entireties by reference.

TECHNICAL FIELD

The present invention relates to a secure booting apparatus with improved speed and a method of operating the same.

BACKGROUND ART

As the demand for data security increases, secure booting of a booting apparatus is becoming mandatory. However, in order to further strengthen security, as the complexity of an encryption algorithm increases according to secure boot, the time it takes to complete booting is gradually increasing.

Accordingly, there is a need for a method of improving the booting speed while the booting apparatus operates according to an encryption algorithm for security.

DESCRIPTION OF EMBODIMENTS

Technical Problem

The present invention provides a secure booting apparatus with enhanced security and speed, and a method of operating the same.

Solution to Problem

A secure booting apparatus according to an embodiment for solving the problems to be solved by the present invention includes: a memory configured to store encrypted data, an encrypted header, and a symmetric key; and a processor configured to generate decrypted data and a decrypted header by applying a symmetric key algorithm using the symmetric key to the encrypted data and header, to include a public key and a pre key generated from the public key in the decrypted header, to generate a comparison hashed message by applying a hash algorithm to the decrypted data, to generate a final verification value by applying a public key algorithm using the public key and the pre key to the decrypted header, to compare the comparison hashed message with the final verification value, and to determine that booting has failed if the comparison hashed message and the final verification value are different from each other.

In the present embodiment, the pre key is a result obtained by calculating $P=(C^2) \bmod n$, where P may indicate the pre key, C may indicate a constant, and n may indicate a portion of the public key.

In the present embodiment, the decrypted header may further include a signature, and the processor may generate the final verification value by applying a public key algorithm using the public key and the pre key to the signature.

In the present embodiment, the decrypted header further includes a signature, and the processor applies the public key algorithm by sequentially performing $A=(S*P) \bmod n$, $B=(A^k) \bmod n$, and $R=B \bmod n$, where S may indicate the signature, P may indicate the pre key, k and n may indicate the public key, and R may indicate the final verification value.

In the present embodiment, the signature is generated by applying a public key algorithm using a private key to a reference-hashed message generated by applying a hash algorithm to unencrypted data, and the private key may be paired with the public key.

In the present embodiment, the memory may further store a reference hashed public key, and the processor may generate a comparison hashed public key by applying a hash algorithm to the public key, may compare the reference hashed public key with the comparison hashed public key, and may determine that booting has failed if the reference hashed public key and the comparison hashed public key are different from each other.

In the present embodiment, the memory may further store a software-specific comparison magic number, the decrypted header may further include a reference magic number, and the processor may compare the comparison magic number with the reference magic number, and may determine that booting has failed if the comparison magic number and the reference magic number are different from each other.

In the present embodiment, the encrypted data and the encrypted header are stored in a NAND memory, and the symmetric key may be stored in a one-time programmable (OTP) memory different from the NAND memory.

A method of operating a secure booting apparatus according to an embodiment for solving the problems to be solved by the present invention includes: generating, by a processor, decrypted data and decrypted header by applying a symmetric key algorithm using a symmetric key stored in the memory to encrypted data and header stored in a memory; generating, by the processor, a comparison hashed message by applying a hash algorithm to the decrypted data; generating, by the processor, a final verification value by applying a public key algorithm using a public key and a pre key, which are included in the decrypted header, to the decrypted header; and comparing the comparison hashed message with the final verification value and determining that booting has failed if the comparison hashed message and the final verification value are different from each other.

In the present embodiment, the pre key is a result obtained by calculating $P=(C^2) \bmod n$, where P may indicate the pre key, C may indicate a constant, and n may indicate a portion of the public key.

In the present embodiment, the decrypted header may further include a signature, and the generating of the final verification value may include generating the final verification value by applying a public key algorithm using the public key and the pre key to the signature.

In the present embodiment, the decrypted header may further include a signature, and the generating of the final verification value is done by sequentially performing $A=(S*P) \bmod n$, $B=(A^k) \bmod n$, and $R=B \bmod n$, where S may indicate the signature, P may indicate the pre key, k and n may indicate the public key, and R may indicate the final verification value.

In the present embodiment, the method may further include: comparing, by the processor, a software-specific comparison magic number stored in the memory with a reference magic number included in the decrypted header, and determining that booting has failed if the comparison magic number and the reference magic number are different from each other.

In the present embodiment, the method may further include: generating, by the processor, a comparison hashed public key by applying a hash algorithm to the public key, comparing a reference hashed public key stored in the memory with the comparison hashed public key, and determining that booting has failed if the reference hashed public key and the comparison hashed public key are different from each other.

In a method of operating a secure booting apparatus including a preparation step and a booting step according to an embodiment for solving the problems to be solved by the present invention, wherein the preparation step includes: generating, by the processor, a symmetric key, a public key, and a private key paired with the public key; generating, by the processor, a reference hashed message by applying a hash algorithm to data, and generating a signature by applying a public key algorithm using the private key to the reference hashed message; generating, by the processor, a pre key from the public key by performing at least a portion of a public key algorithm; adding, by the processor, the signature, the public key, and the pre key to a header; generating, by the processor, encrypted data and header by applying a symmetric key algorithm using a symmetric key to the data and the header, and storing the encrypted data and header in a memory; generating, by the processor, a reference hashed public key by applying a hash algorithm to the public key, and storing the reference hashed public key and the symmetric key in the memory.

In the present embodiment, the generating of the pre key from the public key may be applying $P=(C^2) \bmod n$, where P may indicate the pre key, C may indicate a constant, and n may indicate a portion of the public key.

In the present embodiment, the booting step may include: generating, by the processor, decrypted data and decrypted header by applying a symmetric key algorithm using the symmetric key to the encrypted data and header; generating, by the processor, a comparison hashed message by applying a hash algorithm to the decrypted data; generating, by the processor, a final verification value by applying a public key algorithm using the public key and the pre key, which are included in the decrypted header, to the decrypted header; and comparing the comparison hashed message with the final verification value and determining that booting has failed if the comparison hashed message and the final verification value are different from each other.

In the present embodiment, the generating of the final verification value may be done by sequentially performing $A=(S*P) \bmod n$, $B=(A^k) \bmod n$, and $R=B \bmod n$, where S may indicate the signature, P may indicate the pre key, k and n may indicate the public key, and R may indicate the final verification value.

In the present embodiment, the preparation step and the booting may be respectively performed as separate steps.

In the present embodiment, the generating of the pre key and the generating of the final verification value may be respectively performed as separate steps.

Advantageous Effects of Disclosure

According to embodiments of the present invention, because some steps of the Montgomery algorithm are performed in a preparation operation, verification is completed by performing the remaining steps of the Montgomery algorithm in a booting operation, thereby providing a secure booting apparatus with enhanced security and speed and a method of operating the same.

BRIEF DESCRIPTION OF DRAWINGS

FIG. 4 is a view for describing in detail a method of booting a secure booting apparatus according to an embodiment.

MODE OF DISCLOSURE

Figure 1:
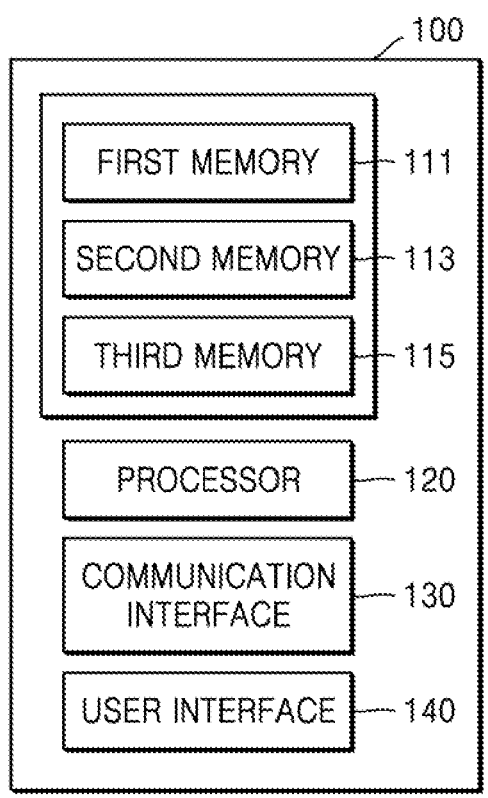
FIG. 1 is a block diagram illustrating a configuration of a secure booting apparatus according to an embodiment.

Since the present invention may have diverse modified embodiments, preferred embodiments are illustrated in the drawings and are described in the detailed description. However, this does not limit the present invention within specific embodiments and it should be understood that the present invention covers all the modifications, equivalents, and replacements within the idea and technical scope of the present invention. In the description of the present invention, certain detailed explanations of the related art are omitted when it is deemed that they may unnecessarily obscure the essence of the present invention.

The terms used herein, only certain embodiments have been used to describe, is not intended to limit the present invention. As used herein, the singular forms "a," "an," and "the" are intended to include the plural forms as well, unless the context clearly indicates otherwise. It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof.

Embodiments of the present invention may be represented by the functional block configurations and various processing steps. Such functional blocks may be realized by a multiple number of hardware configurations performing particular functions and/or software configurations. For example, embodiments of the present invention may adopt IC formations such as memory, processors, logic units and look-up tables, which can perform various functions by controlling more than one microprocessor or by other control systems. Similarly to formation elements being capable of being executable by software programming or software factors, embodiments of the present invention may be realized by programming or scripting languages such as C, C++, Java and assembler, including various algorithms realized by a combination of data structures, processes, routines or other programming formations. Functional aspects may be realized by algorithms executed in more than one processor. In addition, embodiments of the present invention may adopt related-art technology for electronic environment set-up, signal processing, and/or data processing, etc. Terms such as "mechanism", "element", "means", and "formation" may be widely used, and not limited to mechanical and physical formations. The terms above may include meanings of series of routines of software related to a processor, etc.

Reference will now be made in detail to embodiments of the present invention, examples of which are illustrated in the accompanying drawings.

FIG. 1 is a block diagram illustrating a configuration of a secure booting apparatus 100 according to an embodiment.

Referring to FIG. 1, the secure booting apparatus 100 according to an embodiment may include a memory 110, a processor 120, a communication interface 130, and a user interface 140.

The memory 110 may include a first memory 111, a second memory 113, and a third memory 115. The first memory 111, the second memory 113, and the third memory 115 may be nonvolatile memories. The first memory 111, the second memory 113, and the third memory 115 may store different pieces of data, respectively.

The first memory 111 stores encrypted data and an encrypted header. The first memory 111 may be a NAND memory.

The second memory 113 stores a reference hashed public key and an Advanced Encryption Standard (AES) key. The second memory 113 may be a One Time Programmable (OTP) memory.

The third memory 115 stores a software-specific comparison magic number. Software may include, but is not limited to, a boot loader, a kernel, an operating system, an application, and the like. The third memory 115 may be boot read only memory (ROM).

The processor 120 generates decrypted data and decrypted header by applying an AES algorithm using the AES key stored in the second memory 113 to the encrypted data and encrypted header stored in the first memory 111, the decrypted header including an RSA (Rivest, Schamir, Adelman) public key, a signature, and a pre key, generates a comparison hashed message by applying a secure hash algorithm (SHA) to the decrypted data, generates a final verification value by applying an RSA algorithm using the RAS public key and the pre key to the signature, compares a comparison hashed message with the final verification value, and determines that booting has failed if the comparison hashed message and the final verification value are different from each other.

The processor 120 may apply the RSA algorithm for sequentially performing Equations 1 to 3 to the signature. Equations 1 to 3 may be at least a portion of the Montgomery algorithm, which is a type of the RSA algorithm.

$$A=(S*P) \bmod n \quad \text{[Equation 1]}$$

S may indicate the signature, P may indicate the pre key, and n may indicate a portion of an RSA public key (k, n).

$$B=(A^k) \bmod n \quad \text{[Equation 2]}$$

A may indicate A in the left term of Equation 1. k may indicate a portion of the RSA public key (k, n).

$$R=B \bmod n \quad \text{[Equation 3]}$$

B may indicate B of the left term of Equation 2. n may indicate a portion of the RSA public key (k, n), and R may indicate a final verification value.

The signature may be generated by applying the RSA algorithm using an RSA private key to a reference-hashed message generated by applying an SHA algorithm performing Equation 4 to unencrypted data.

$$S=(sha(M)^d) \bmod n \quad \text{[Equation 4]}$$

M may indicate a reference-hashed message. An RSA private key (d, n) may be paired with the RSA public key (k, n).

Meanwhile, the pre key may be a result obtained by calculating Equation 5.

$$P=(C^2) \bmod n \quad \text{[Equation 5]}$$

P may be a pre key, C may be a constant, and n may be the RSA public key (k, n). C may be, for example, 2^4608, but is not limited thereto. Equation 5 may be at least a portion of the Montgomery algorithm, which is a type of the RSA algorithm.

The processor 120 may apply the SHA algorithm to the RSA public key to generate a comparison hashed public key, may compare the reference hashed public key stored in the second memory 113 and the comparison hashed public key, and may determine that booting has failed when the reference hashed public key and the comparison hashed public key are different from each other.

The processor 120 may compare the comparison magic number included in the third memory 115 with the reference magic number included in the decrypted header, and may determine that booting has failed if the comparison magic number and the reference magic number are different from each other.

The processor 120 may determine that booting is successful when the comparison hashed message and the final verification value are identical, the reference hashed public key and the comparison hashed public key are identical, and the comparison magic number and the reference magic number are identical. For example, when the comparison magic number and the reference magic number are the same, the reference hashed public key and the comparison hashed public key are the same, and the comparison hashed message and the final verification value are the same, the processor 120 may determine that booting is successful.

Figure 2:
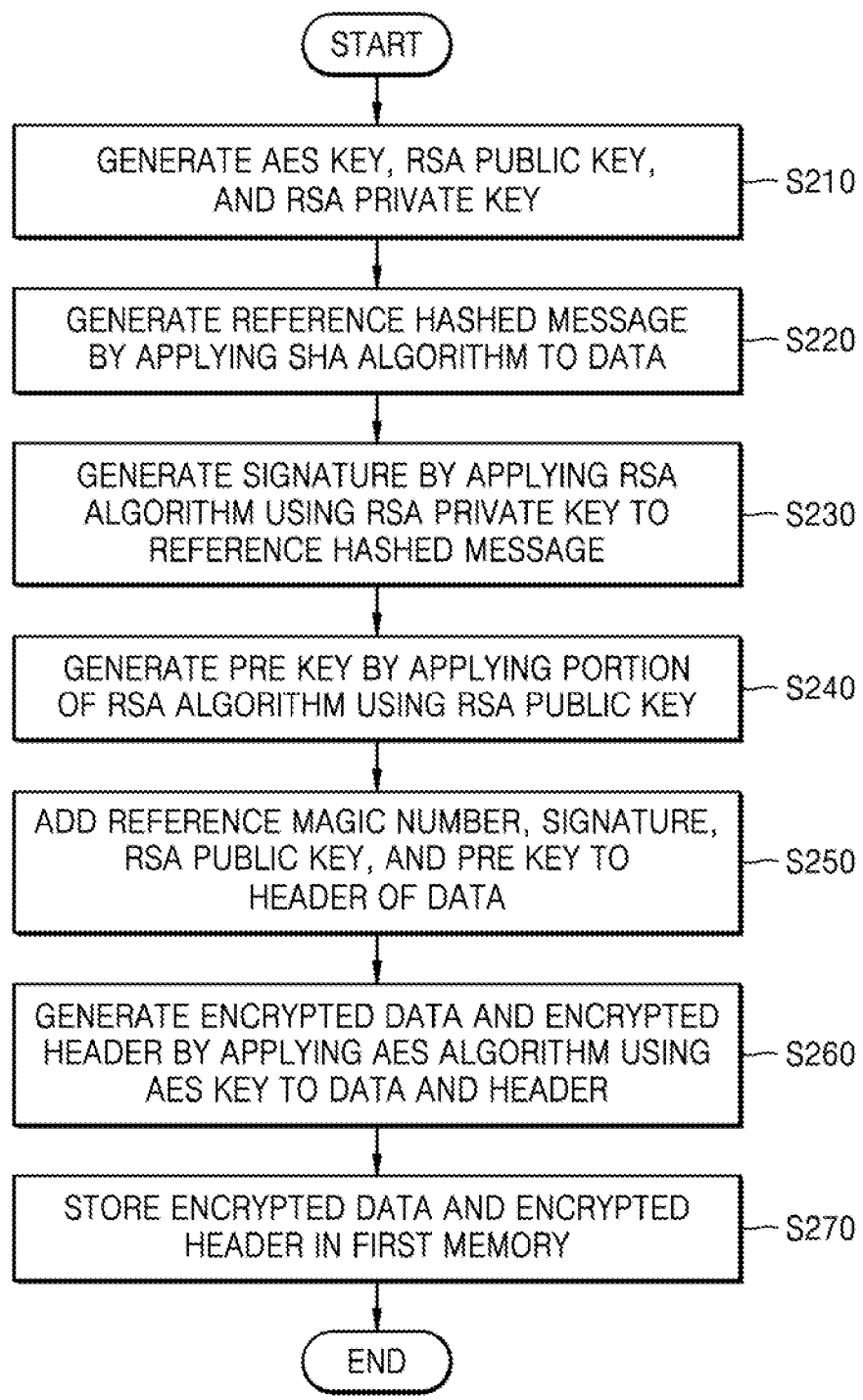
FIGS. 2 and 3 are flowcharts for explaining a preparation operation method of a secure booting apparatus according to an embodiment.
Figure 3:
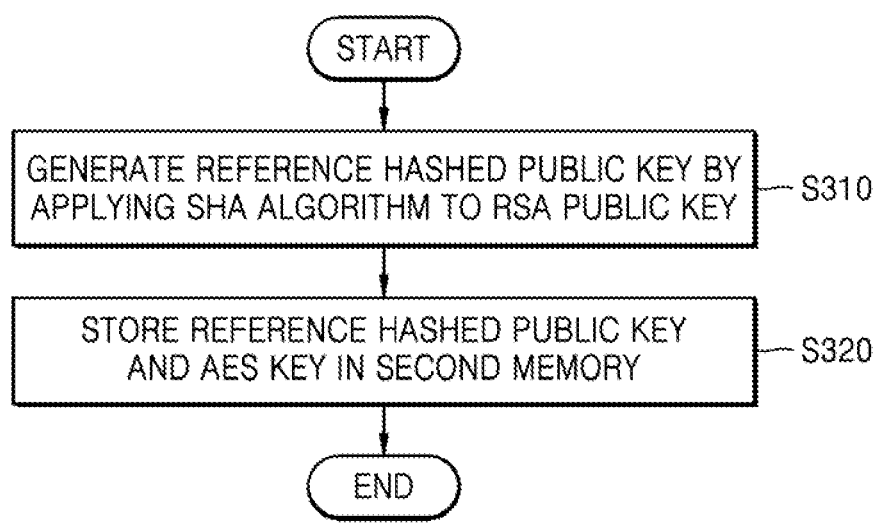

FIGS. 2 and 3 are flowcharts for explaining a preparation operation method of a secure booting apparatus 100 according to an embodiment.

A preparation operation of the secure booting apparatus 100 is performed during the process of the secure booting apparatus 100, and corresponds to an operation of storing data about a boot loader, a kernel, an operating system, and an application in the memory 110. The preparation operation of the secure booting apparatus 100 may be performed by the secure booting apparatus 100 or by a process processor (not shown) other than the secure booting apparatus 100, but is not limited thereto.

Hereinafter, a process in which the preparation operation is performed by the process processor (not shown) will be described in detail, which may be applied to the preparation operation performed by the secure booting apparatus 100 or other devices.

Referring to FIG. 2, in operation S210, the process processor (not shown) generates an AES key, an RSA public key, and an RSA private key.

An RSA public key (k, n) and an RSA private key (d, n) may be paired.

Next, in operation S220, the process processor (not shown) generates a reference-hashed message by applying an SHA algorithm to the data.

The data may be images of the boot loader, the kernel, the operating system, the application, etc., but is not limited thereto.

Next, in operation S230, the process processor (not shown) generates a signature by applying an RSA algorithm using the RSA private key to the reference-hashed message.

In this case, the process processor (not shown) may generate a signature using Equation 4.

Next, in operation S240, the process processor (not shown) generates a pre key by applying a portion of the RSA algorithm using the RSA public key.

In this case, the process processor (not shown) may generate a pre key using Equation 5.

Next, in operation S250, the process processor (not shown) adds a reference magic number, the signature, the RSA public key, and the pre key to a header of the data.

Next, in operation S260, the process processor (not shown) generates encrypted data and encrypted header by applying an AES algorithm using the AES key to the data and header, and in operation S270, stores the encrypted data and encrypted header in the first memory 111.

Referring to FIG. 3, in operation S310, the process processor (not shown) generates a reference hashed public key by applying the SHA algorithm to the RSA public key.

Next, in operation S320, the process processor (not shown) stores the reference hashed public key and the AES key in the second memory 113.

Although not shown in FIGS. 2 and 3, in addition to Equation 5, other operations that do not affect security may be performed in the preparation operation of the secure booting apparatus 100 of the present invention. Accordingly, secure booting with enhanced security and speed may be performed because verification is completed by performing only operations affecting security in a booting operation.

FIG. 4 is a view for describing in detail a method of booting a secure booting apparatus according to an embodiment.

A booting operation of the secure booting apparatus 100 corresponds to an operation of verifying data about a boot loader, a kernel, an operating system, and an application stored in the memory 110 by a preparation operation of the secure booting apparatus 100 described above with reference to FIGS. 2 and 3. The booting operation of the secure booting apparatus 100 may be performed by the secure booting apparatus 100, but is not limited thereto.

Referring to FIG. 4, in operation S410, the processor 120 generates decrypted data and decrypted header by applying an AES algorithm using an AES key to encrypted data and encrypted header stored in the first memory 111.

Next, in operation S420, the processor 120 compares the software-specific comparison magic number stored in the third memory 115 with a reference magic number included in the decrypted header.

Because of the comparison, in operation S490, if the comparison magic number and the reference magic number are different from each other, the processor 120 determines that booting has failed.

According to embodiments of the present invention, because the secure booting apparatus 100 is booted only when software-specific comparison information stored in the third memory 115 is verified using a result of decrypting software-specific information encrypted in the process and stored in the first memory 111, boot security may be further strengthened.

On the other hand, if the comparison magic number and the reference magic number are the same, in operation S430, the processor 120 generates a comparison hashed public key by applying an SHA algorithm to an RSA public key included in the decrypted header.

Next, in operation S440, the processor 120 compares a reference hashed public key stored in the second memory 113 with the comparison hashed public key.

Because of the comparison, if the reference hashed public key and the comparison hashed public key are different from each other, in operation S490, the processor 120 determines that booting has failed.

According to embodiments of the present invention, because the secure booting apparatus 100 is booted only when encryption key information stored in the second memory 113 in the process is verified in the process by using a result of decrypting encryption key information encrypted in the process and stored in the first memory 111, boot security may be further strengthened.

On the other hand, if the reference hashed public key and the comparison hashed public key are the same, in operation S450, the processor 120 generates a comparison-hashed message by applying the SHA algorithm to the decrypted data.

Next, in operation S460, the processor 120 generates a final verification value by applying an RSA algorithm using the RSA public key and the pre key included in the decrypted header to a signature included in the decrypted header.

In this case, the processor 120 may apply the RSA algorithm for sequentially performing Equations 1 to 3 to the signature included in the decrypted header.

Meanwhile, Montgomery algorithm is an algorithm for verifying encrypted information by sequentially applying Equation 5, Equation 1, Equation 2, and Equation 3. According to embodiments of the present invention, because some steps of the Montgomery algorithm applying Equation 5 have already been performed in the preparation operation, verification is completed only by performing the remaining steps of the Montgomery algorithm applying Equations 1 to 3 in the booting operation, so secure booting speed may be greatly improved.

Next, in operation S470, the processor 120 compares the comparison hashed message, a public key, and the final verification value.

Because of the comparison, if the comparison hash message and the final verification value are different from each other, in operation S490, the processor 120 determines that booting has failed.

According to embodiments of the present invention, because the secure booting apparatus 100 is booted only when a result of decrypting the header stored in the first memory 111 after being encrypted in the process is verified by using a result of decrypting the data encrypted in the process and stored in the first memory 111, boot security may be further strengthened.

On the other hand, if the comparison hashed message and the final verification value are the same, in operation S480, the processor 120 determines that booting is successful.

According to embodiments of the present invention, because the secure booting apparatus 100 is booted only when verification of various information is completed in various ways, boot security may be further strengthened.

The present invention has been described above with reference to preferred embodiments thereof. Those of ordinary skill in the art to which the present invention pertains will understand that the present invention can be implemented in modified forms without departing from the essential characteristics of the present invention.

It should be understood that embodiments described herein should be considered in a descriptive sense only and not for purposes of limitation. The scope of the present invention is indicated in the claims rather than the above description, and the invention claimed by the claims and inventions equivalent to the claimed invention should be construed as being included in the present invention.

The invention claimed is:

1. A secure booting apparatus comprising:
a memory storing encrypted data and an encrypted header;
a one-time programmable (OTP) memory storing a symmetric key algorithm and a public key algorithm;

a read only memory (ROM) storing a software-specific comparison magic number; and a processor configured to:

generate decrypted data and a decrypted header by applying the symmetric key algorithm to the encrypted data and the encrypted header, the decrypted header comprising a public key, a pre key, a signature, and a reference magic number;

generate a comparison hashed message by applying a hash algorithm to the decrypted data;

generate a final verification value by applying the public key algorithm to the decrypted header; and determine whether booting is successful according to a result of comparing the comparison hashed message with the final verification value, and a result of comparing the reference magic number included in the decrypted header with the software-specific comparison magic number stored in the ROM.

2. The secure booting apparatus of claim 1,
wherein the public key algorithm uses the public key and the pre key.

3. The secure booting apparatus of claim 2, wherein the pre key is a result obtained by calculating P=(C^2) mod n,
where P indicates the pre key, C indicates a constant, and n indicates a portion of the public key.

4. The secure booting apparatus of claim 2,
wherein the public key algorithm is applied to the signature.

5. The secure booting apparatus of claim 4, wherein the public key algorithm is applied by sequentially performing A=(S*P) mod n, B=(A^k) mod n, and R=B mod n,
where S indicates the signature, P indicates the pre key, k and n indicates the public key, and R indicates the final verification value.

6. The secure booting apparatus of claim 4, wherein the signature is generated by applying a public key algorithm using a private key to a reference hashed message generated by applying a hash algorithm to unencrypted data, and
wherein the private key is paired with the public key.

7. The secure booting apparatus of claim 2, wherein the OTP memory further stores a reference hashed public key, and
wherein the processor is further configured to:
generate a comparison hashed public key by applying a hash algorithm to the public key; and
determine whether booting is successful or not according to the result of comparing the reference hashed public key and the comparison hashed public key.

8. A method of operating a secure booting apparatus comprising a preparation step and a booting step, wherein the preparation step comprises:
generating, by a processor, a reference hashed message by applying a hash algorithm to data;
generating, by the processor, a signature by applying a public key algorithm to the reference hashed message;
generating, by the processor, a pre key from a public key by performing at least a portion of the public key algorithm;
generating, by the processor, encrypted data and an encrypted header by applying a symmetric key algorithm to the data and a header;
storing, by a memory, the encrypted data and the encrypted header,
wherein the header comprises the public key, the pre key, the signature, and a reference magic number; and
storing, by a read only memory (ROM), a software-specific comparison magic number, and wherein the booting step comprises:
generating, by the processor, decrypted data and a decrypted header by applying the symmetric key algorithm to the encrypted data and encrypted header;
generating, by the processor, a comparison hashed message by applying a hash algorithm to the decrypted data;
generating, by the processor, a final verification value by applying the public key algorithm to the decrypted header; and
determining, by the processor, whether booting is successful according to a result of comparing the comparison hashed message with the final verification value, and according to a result of comparing the reference magic number included in the header with the software-specific comparison magic number stored in the ROM,
wherein the symmetric key algorithm uses a symmetric key, and the symmetric key is stored in a one-time programmable (OTP) memory different from a NAND memory, and
wherein the public key algorithm uses the public key, and the public key algorithm is stored in the OTP memory.

9. The method of claim 8, wherein the generating the pre key from the public key is done by applying P=(C^2) mod n,
where P indicates the pre key, C indicates a constant, and n indicates a portion of the public key.

10. The method of claim 9, wherein the preparation step and the booting step are respectively performed as separate steps.

11. The method of claim 9, wherein the generating the pre key and the generating the final verification value are respectively performed as separate steps.

12. The method of claim 8, wherein the generating of the final verification value comprises applying the public key algorithm to the signature included in the encrypted header.

13. The method of claim 8, wherein the generating of the final verification value is done by sequentially performing A=(S*P) mod n, B=(A^k) mod n, and R=B mod n,
where S indicates the signature, P indicates the pre key, k and n indicates the public key, and R indicates the final verification value.

14. The method of claim 8, further comprises:
storing, by the OTP memory, a reference hashed public key;
generating, by the processor, a comparison hashed public key by applying a hash algorithm to the public key; and
determining, by the processor, whether booting is successful according to a result of comparing the reference hashed public key and the comparison hashed public key.

15. The method of claim 8, wherein the encrypted data and the encrypted header are stored in the NAND memory.

16. A secure booting apparatus comprising:
a memory storing encrypted data and an encrypted header;
a one-time programmable (OTP) memory storing a symmetric key algorithm, a public key algorithm, and a reference hashed public key;
a read only memory (ROM) storing a software-specific comparison magic number; and
a processor configured to:
generate decrypted data and a decrypted header by applying the symmetric key algorithm to the encrypted data and the encrypted header, the decrypted header comprising a reference magic number, a signature, a public key, and a pre key;

determine whether a booting process continues according to a result of comparing the reference magic number stored in the memory with the software-specific comparison magic number stored in the ROM;

generate a comparison hashed public key by applying a hash algorithm to the public key included in the decrypted header;

determine whether a booting process continues according to a result of comparing the comparison hashed public key with the reference hashed public key stored in the OTP memory;

generate a comparison hashed message by applying the hash algorithm to the decrypted data stored in the memory;

generate a final verification value by applying the public key algorithm stored in the OTP memory to the signature included in the decrypted header; and then determine whether booting is successful according to a result of comparing the comparison hashed message with the final verification value.

\* \* \* \* \*